US012669798B2

(12) United States Patent
Watanabe et al.

(10) Patent No.: US 12,669,798 B2
(45) Date of Patent: Jun. 30, 2026

(54) NUMERICAL CONTROL DEVICE HAVING MACHINE TOOL SETUP FUNCTION AND STORAGE MEDIUM

(71) Applicant: Fanuc Corporation, Minamitsuru-gun (JP)

(72) Inventors: Kanta Watanabe, Minamitsuru-gun (JP); Kazuhiro Hirauchi, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 308 days.

(21) Appl. No.: 18/273,071

(22) PCT Filed: Jan. 28, 2022

(86) PCT No.: PCT/JP2022/003440
§ 371 (c)(1),
(2) Date: Jul. 19, 2023

(87) PCT Pub. No.: WO2022/163839
PCT Pub. Date: Aug. 4, 2022

(65) Prior Publication Data
US 2024/0004366 A1 Jan. 4, 2024

(30) Foreign Application Priority Data
Feb. 1, 2021 (JP) ................................. 2021-014608

(51) Int. Cl.
*G05B 19/4093* (2006.01)
*G05B 19/401* (2006.01)
(52) U.S. Cl.
CPC ..... *G05B 19/40938* (2013.01); *G05B 19/401* (2013.01)

(58) Field of Classification Search
CPC ............ G05B 19/40938; G05B 19/401; G05B 2219/50123; G05B 2219/50124; G05B 19/4097; B23Q 15/00; B23Q 15/22
See application file for complete search history.

(56) References Cited

U.S. PATENT DOCUMENTS

2005/0085940 A1* 4/2005 Griggs ................. G05B 19/401
                                                          700/181
2005/0243019 A1 11/2005 Fuller et al.
(Continued)

FOREIGN PATENT DOCUMENTS

CN 1394714 A 2/2003
CN 1722105 A 1/2006
(Continued)

OTHER PUBLICATIONS

International Search Report and Written Opinion for International Application No. PCT/JP2022/003440, dated Apr. 5, 2022, 6 pages.
(Continued)

*Primary Examiner* — Christopher E. Everett
(74) *Attorney, Agent, or Firm* — BUCHANAN INGERSOLL & ROONEY PC

(57) ABSTRACT

A device that creates information related to a machining program includes a numerical control device, a PC in which machining program creation software is installed, and a dedicated device that is an emulator for the numerical control device. The numerical control device acquires setup information required for a setup operation from the information related to the machining program of a machine tool controlled by the numerical control device and acquires setup basic information from information registered in a device configured to execute the machining program of the machine tool. Setup support information is then generated from the setup information and the setup basic information. Accordingly, the numerical control device supports a setup (Continued)

operation of the machining program by using the acquired setup information and the generated setup support information.

8 Claims, 14 Drawing Sheets

(56) References Cited

U.S. PATENT DOCUMENTS

| 2007/0016325 | A1* | 1/2007 | Esterling | G05B 19/4065 |
| | | | | 700/175 |
| 2015/0309499 | A1 | 10/2015 | Tezuka et al. | |
| 2015/0378347 | A1 | 12/2015 | Sato et al. | |
| 2017/0031345 | A1* | 2/2017 | Ono | G05B 19/409 |
| 2017/0131692 | A1* | 5/2017 | Kawai | G05B 19/409 |
| 2017/0308063 | A1* | 10/2017 | Kawai | G05B 19/406 |
| 2018/0024525 | A1 | 1/2018 | Inoue | |
| 2019/0129382 | A1 | 5/2019 | Saitou | |
| 2019/0235474 | A1 | 8/2019 | Eto et al. | |
| 2020/0230771 | A1 | 7/2020 | Kasahara et al. | |
| 2021/0026340 | A1 | 1/2021 | Fujita | |

FOREIGN PATENT DOCUMENTS

| CN | 103513609 | A | 1/2014 |
| CN | 105122160 | A | 12/2015 |
| CN | 108717288 | A | 10/2018 |
| CN | 109725602 | A | 5/2019 |
| CN | 112291541 | A | 1/2021 |
| JP | 0264711 | A | 3/1990 |
| JP | 05253794 | A | 10/1993 |
| JP | 09212221 | A | 8/1997 |
| JP | 2000210839 | A | 8/2000 |
| JP | 2018018155 | A | 2/2018 |
| JP | 2018-032157 | A | 3/2018 |
| JP | 6482737 | B1 | 3/2019 |
| JP | 2019063914 | A | 4/2019 |
| WO | 2019138475 | A1 | 7/2019 |

OTHER PUBLICATIONS

Office Action (The First Office Action) issued May 30, 2025, by the State Intellectual Property Office of People's Republic of China in corresponding Chinese Patent Application No. 202280011514.X and an English translation of the Office Action. (12 pages).
Office Action (Notification to Grant Patent Right) issued Sep. 11, 2025, by the State Intellectual Property Office of People's Republic of China in corresponding Chinese Patent Application No. 202280011514.X and an English translation of the Office Action. (4 pages).

* cited by examiner

FIG. 4

SETUP INFORMATION

| T COMMAND | T1, T2 |
|---|---|
| MATERIAL SHAPE COMMAND | G1902 |
| MATERIAL SHAPE | RECTANGULAR PARALLELEPIPED (DEPTH: 100, WIDTH: 100, HEIGHT: 50) |
| WORKPIECE ORIGIN POSITION | (50, 50, 50) |

SETUP BASIC INFORMATION

| T COMMAND | TOOL INFORMATION |
|---|---|
| T1 | DRILL TOOL |
| T2 | CHAMFERING TOOL |

SETUP SUPPORT INFORMATION

| T COMMAND | TOOL INFORMATION |
|---|---|
| T1 | DRILL TOOL |
| T2 | CHAMFERING TOOL |

| WORKPIECE ORIGIN | MEASURING METHOD |
|---|---|
| (DEPTH X 0.5, WIDTH X 0.5, HEIGHT) ... | WIDTH MEASUREMENT |
| (DEPTH, 0, HEIGHT) ... | END FACE MEASUREMENT |

| MEASUREMENT TARGET | MEASURING METHOD |
|---|---|
| MATERIAL SHAPE OF RECTANGULAR PARALLELEPIPED | WIDTH MEASUREMENT |
| FROM WORKPIECE ORIGIN POSITION (50, 50, 50) | WIDTH MEASUREMENT |

FIG. 6

SETUP INFORMATION

| T COMMAND | T3, T4 |
|---|---|
| MATERIAL SHAPE COMMAND | G1900 |
| MATERIAL SHAPE | ROUND BAR (MATERIAL DIAMETER: 50, MATERIAL LENGTH: 100) |
| WORKPIECE ORIGIN POSITION | (25, 25, 100) |

SETUP BASIC INFORMATION

| T COMMAND | TOOL INFORMATION |
|---|---|
| T3 | FLAT ENDMILL TOOL |
| T4 | TAPPING TOOL |

SETUP SUPPORT INFORMATION

| T COMMAND | TOOL INFORMATION |
|---|---|
| T3 | FLAT ENDMILL TOOL |
| T4 | TAPPING TOOL |

| WORKPIECE ORIGIN | MEASURING METHOD |
|---|---|
| (DEPTH X 0.5, WIDTH X 0.5, MATERIAL LENGTH) ... | OUTER DIAMETER MEASUREMENT |

| MEASUREMENT TARGET | MEASURING METHOD |
|---|---|
| WORKPIECE ORIGIN POSITION (25, 25, 100) | OUTER DIAMETER MEASUREMENT |

FIG. 8

SETUP INFORMATION

| T COMMAND | T1, T2 |
|---|---|
| MATERIAL SHAPE COMMAND | G1902 |
| MATERIAL SHAPE | RECTANGULAR PARALLELEPIPED (DEPTH: 100, WIDTH: 100, HEIGHT: 50) |
| WORKPIECE ORIGIN POSITION | (50, 50, 50) |

SETUP BASIC INFORMATION

| T COMMAND | TOOL INFORMATION | ATTACHMENT STATE | TOOL LIFETIME |
|---|---|---|---|
| T1 | DRILL TOOL | ALREADY ATTACHED | LIFETIME EXPIRED |
| T2 | CHAMFERING TOOL | NOT YET ATTACHED | LIFETIME LEFT |

SETUP SUPPORT INFORMATION

| T COMMAND | TOOL INFORMATION | ATTACHMENT STATE | TOOL LIFETIME |
|---|---|---|---|
| T1 | DRILL TOOL | ALREADY ATTACHED | LIFETIME EXPIRED |
| T2 | CHAMFERING TOOL | NOT YET ATTACHED | LIFETIME LEFT |

| WORKPIECE ORIGIN | MEASURING METHOD |
|---|---|
| (DEPTH X 0.5, WIDTH X 0.5, HEIGHT) ... | WIDTH MEASUREMENT |
| (DEPTH, 0, HEIGHT) ... | END FACE MEASUREMENT |

| MEASUREMENT TARGET | MEASURING METHOD |
|---|---|
| MATERIAL SHAPE OF RECTANGULAR PARALLELEPIPED | WIDTH MEASUREMENT |
| FROM WORKPIECE ORIGIN POSITION (50, 50, 50) | WIDTH MEASUREMENT |

FIG. 11

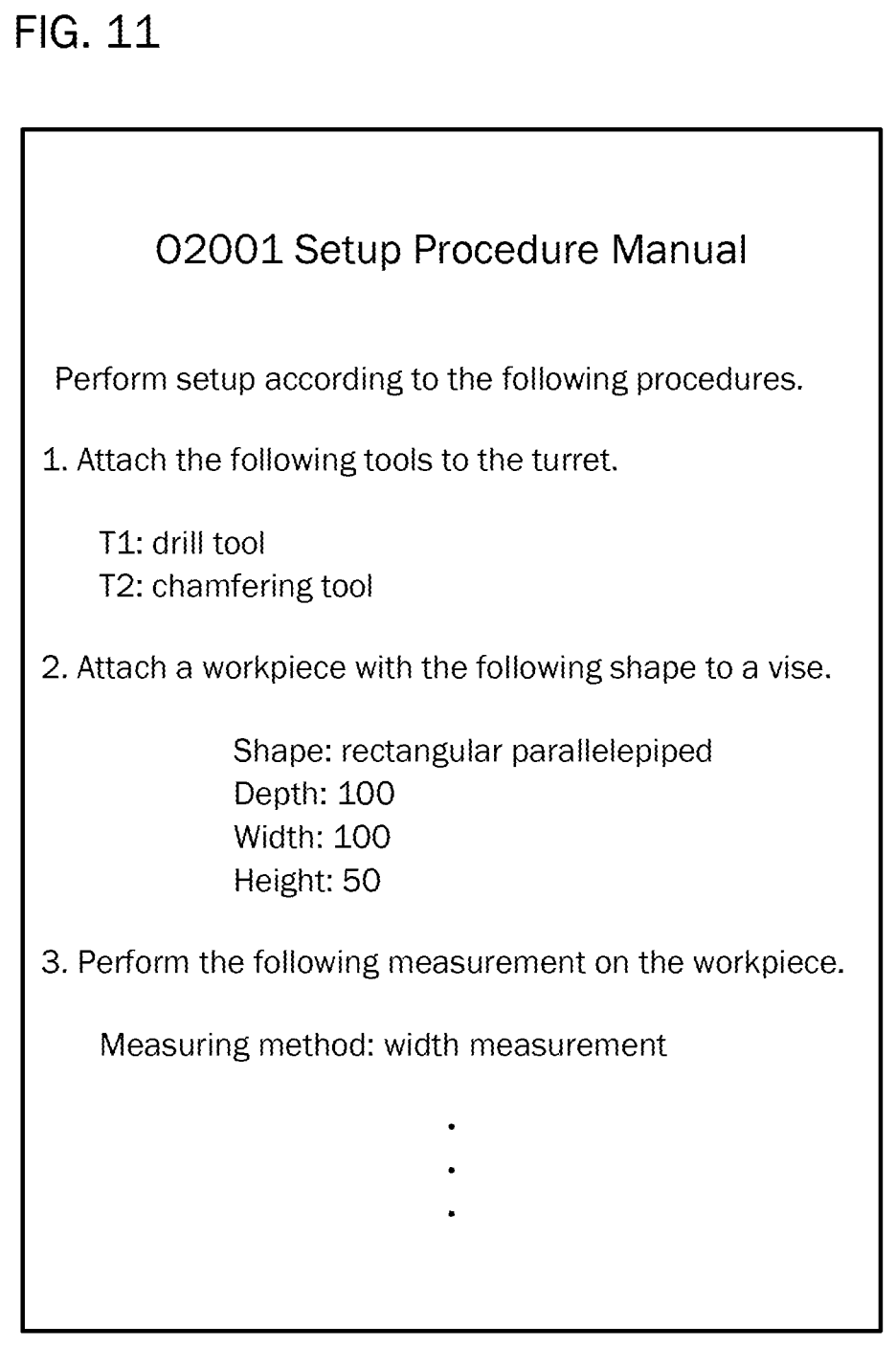

O2001 Setup Procedure Manual

Perform setup according to the following procedures.

1. Attach the following tools to the turret.

T1: drill tool
   T2: chamfering tool

2. Attach a workpiece with the following shape to a vise.

Shape: rectangular parallelepiped
   Depth: 100
   Width: 100
   Height: 50

3. Perform the following measurement on the workpiece.

Measuring method: width measurement

NUMERICAL CONTROL DEVICE

SERVER

O2001 Setup Procedure Manual

Perform setup according to the following procedures.

1. Attach the following tools to the turret.

T1: drill tool
T2: chamfering tool

2. Attach a workpiece with the following shape to a vise.

Shape: rectangular parallelepiped
Depth: 100
Width: 100
Height: 50

3. Perform the following measurement on the workpiece.

Measuring method: width measurement

. . .

NUMERICAL CONTROL DEVICE HAVING MACHINE TOOL SETUP FUNCTION AND STORAGE MEDIUM

CROSS REFERENCE TO RELATED APPLICATIONS

This is the U.S. National Phase application of PCT/JP2022/003440, filed Jan. 28, 2022, which claims priority to Japanese Patent Application No. 2021-014608, filed Feb. 1, 2021, the disclosures of each of these applications being incorporated herein by reference in their entireties for all purposes.

FIELD OF THE INVENTION

The present invention relates to a numerical control device having a machine tool setup support function and a computer readable storage medium for performing setup support.

BACKGROUND OF THE INVENTION

A numerical control device is a device for controlling a machine tool and controls an amount of movement, a movement speed, or the like of a tool by using numeric values. A series of setting operations before machining is controlled by a numerical control device is referred to as "setup". In a setup operation, a tool and a workpiece are attached, a workpiece coordinate system, a workpiece origin, and correction are set, and a machining program is transferred or created.

To set the workpiece coordinate system and the workpiece origin, the workpiece needs to be measured. A probe is used for measurement of a workpiece. A probe is a device to detect contact with a workpiece. Once a probe is attached to a spindle of a machine tool and a measurement program is executed, the numerical control device automatically measures a workpiece. The numerical control device sets a workpiece coordinate system and a workpiece origin based on a result of the measurement.

When designating a measurement position of a workpiece, for example, the art of Patent Literature 1 captures an image of the workpiece and the area thereuaround, accepts input of an auxiliary point and an approach point from an operator, and narrows down measurement candidates based on the positions of the input auxiliary point and approach point and the shape of the workpiece.

In the art of Patent Literature 1, after the operator mounts a workpiece, captures an image of the workpiece by a camera, and designates the auxiliary point and the approach point, measurement candidates are displayed in a list, and a workpiece measurement program is determined.

PATENT LITERATURE

Patent Literature 1: Japanese Patent Application Laid-Open No. 2018-18155

SUMMARY OF THE INVENTION

Setup operations differ for respective machining programs. An operator has to review a machining program and check the workpiece origin position or a tool to use before performing a setup operation.

Checking the content of a machining program is complicated work. When a person who performs machining differs from a person who has created a program, the former may take time to understand the content of the program or may perform an erroneous setup operation.

In the field of machine tools, there is a demand for a technology to make a setup operation more efficient.

A numerical control device that controls a machine tool includes: a setup information acquisition unit that acquires setup information required for a setup operation from machining program related information including at least one of a part or whole of a machining program of the machine tool or information related to the machining program; a setup support information generation unit that acquires setup basic information from device registration information registered in a device configured to execute a machining program of the machine tool and generates setup support information from the setup information and the setup basic information; and a setup support unit that supports a setup operation of the machining program by using the setup information and the setup support information.

A storage medium that is one aspect of the present disclosure stores a computer readable instruction for: when executed by one or a plurality of processors: acquiring setup information required for a setup operation from machining program related information including at least one of a part or whole of a machining program of a machine tool or information related to the machining program; acquiring setup basic information from device registration information registered in a device configured to execute a machining program of the machine tool and generating setup support information from the setup information and the setup basic information; and performing setup support corresponding to the machining program by using the setup support information.

According to one aspect of the present invention, a setup operation can be made more efficient.

BRIEF DESCRIPTION OF DRAWINGS

FIG. 4 is a diagram illustrating an example of setup information, setup basic information, and setup support information of a first disclosure.

FIG. 6 is a diagram illustrating an example of setup information, setup basic information, and setup support information of a second disclosure.

FIG. 8 is a diagram illustrating an example of setup information, setup basic information, and setup support information of a third disclosure.

FIG. 11 is a diagram illustrating an example of a setup procedure manual.

FIG. 12 is a diagram illustrating sharing of a setup procedure manual.

DETAILED DESCRIPTION OF EMBODIMENTS OF THE INVENTION

[First Disclosure]

Figure 1:
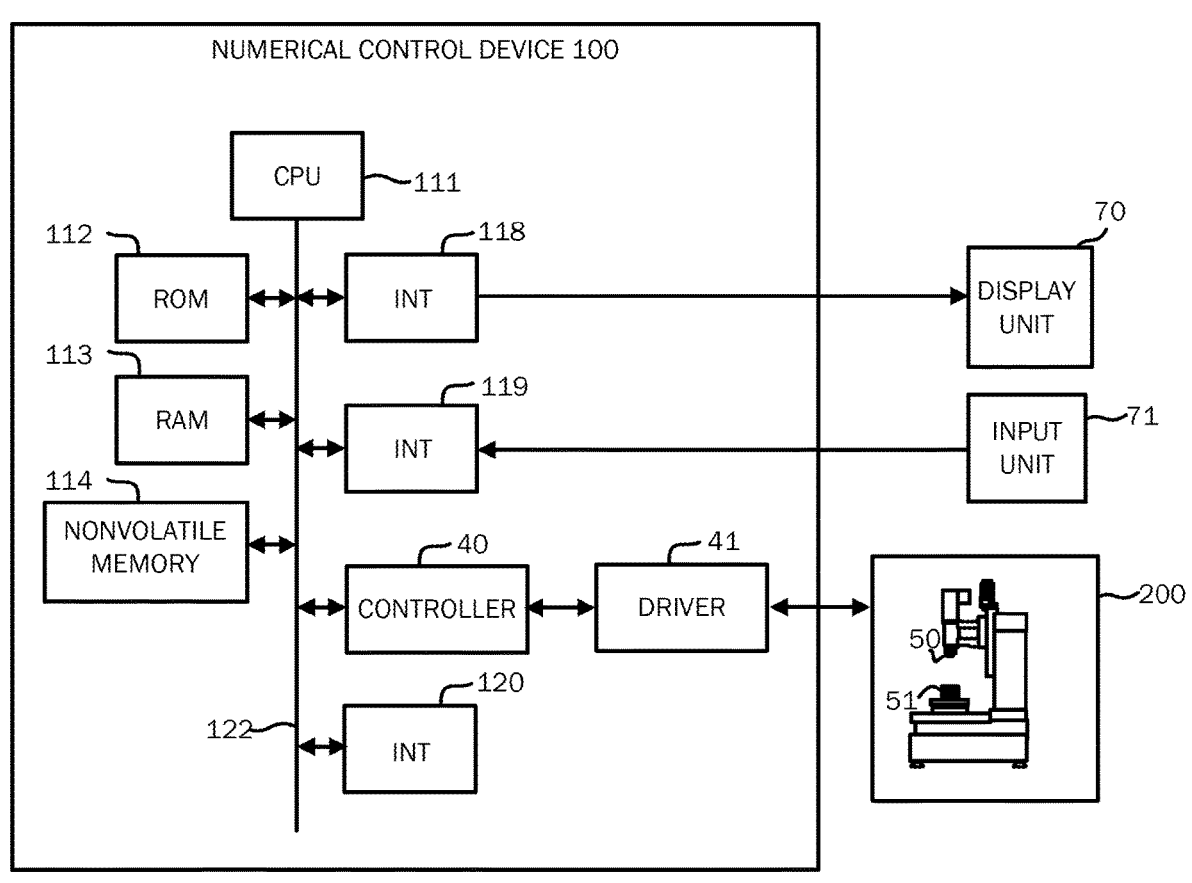
FIG. 1 is a diagram illustrating a hardware configuration of a numerical control device.

FIG. 1 is a schematic diagram of a numerical control device 100. The numerical control device 100 has a function of causing a machine tool 200 to perform a setup operation.

The numerical control device 100 of FIG. 1 is connected to the machine tool 200. Although separated in FIG. 1, the numerical control device 100 and the machine tool 200 may be integrated.

A workpiece 51 is attached to a table of the machine tool 200. A probe 50 is attached to the spindle of the machine tool 200. The probe 50 moves in three axis directions of the X-axis, Y-axis, and Z-axis. The probe 50 detects contact with the workpiece 51. The numerical control device 100 measures the workpiece 51 based on the position at which the probe 50 comes into contact with the workpiece 51. The wall of the numerical control device 100 is provided with a display unit 70 and an input unit 71 such as a keyboard, a touch panel, or the like integrated with or separated from the display unit. An operator operates the input unit 71 to perform a setup operation.

The numerical control device 100 will be described below. A CPU 111 of the numerical control device 100 in FIG. 1 is a processor that controls the overall numerical control device 100. The CPU 111 reads a system program stored in a ROM 112 via a bus 122 and controls the overall numerical control device 100 according to the system program. A RAM 113 temporarily stores temporary calculation data or display data, various data input by a user via the input unit 71, or the like.

The display unit 70 is a monitor or the like attached to the numerical control device 100. The display unit 70 displays a setup support window, a setup procedure manual, or the like described later.

The input unit 71 is a keyboard, a touch panel, or the like integrated with the display unit 70 or separated from the display unit 70. The user operates the input unit 71 to perform entry to a window displayed on the display unit 70 or the like.

For example, a nonvolatile memory 114 is a memory that is backed up by a battery (not illustrated) or the like and whose storage status is maintained even when the numerical control device 100 is powered off. The nonvolatile memory 114 stores a program loaded from an external device via an interface (not illustrated), a program input via the input unit 71, various data acquired from each unit of the numerical control device 100, the machine tool 200, or the like (for example, a setting parameter acquired from the machine tool 200 or the like). The program or various data stored in the nonvolatile memory 114 may be loaded into the RAM 113 when executed or used. Further, various system programs are written in advance in the ROM 112.

A controller 40 that controls each axis of the machine tool 200 converts a motion command for the axis from the CPU 111 into a pulsed signal and outputs the pulsed signal to a driver 41. The driver 41 converts the pulsed signal into current to drive a motor.

The probe 50 is attached to a drive unit (spindle or the like). The motor moves the probe 50. In the present disclosure, the probe 50 moves relatively in three XYZ-axis directions but may move in four axes or five axes.

The probe 50 is a device that detects the position of a measuring target. The probe 50 of the present disclosure is of a contact system. The probe 50 may be of an infrared system, a wireless system, a dielectric system, or the like.

A device to which the present disclosure is applied will be described with reference to FIG. 2.

The numerical control device 100, a PC 300, and a dedicated device 400 are devices to create information related to a machining program (machining program related information). In the numerical control device 100, the PC 300, and the dedicated device 400, an environment for creating a machining program is constructed.

Software for creating a machining program is installed in the PC 300. The numerical control device 100 can create a machining program in response to operations on a button, a screen, or the like. The dedicated device 400 is an emulator for the numerical control device 100, and the same button and screen as those of the numerical control device 100 are provided, so that the dedicated device 400 can create a machining program in the same environment as that in the numerical control device 100.

Figure 2:
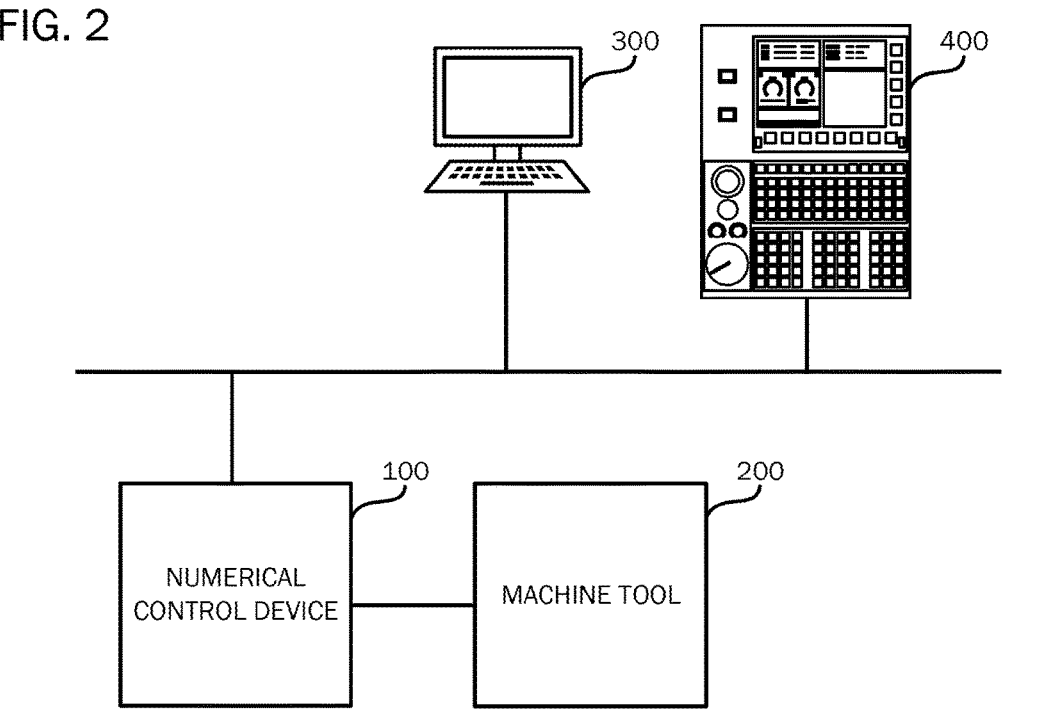
FIG. 2 is a diagram illustrating a device that creates machining program related information.

The machining program related information created by the device of FIG. 2 includes the whole machining program or a part of a machining program or at least one piece of information related to a machining program. As used herein, the information related to a machining program means information required for individual machining such as a turret number of a turret to which a tool used for machining is attached, a shape of a workpiece to be machined, or the like.

On the other hand, the numerical control device 100, the PC 300, and the dedicated device 400 each are also a device to execute a machining program. The numerical control device 100 has a function of executing a machining program to actually control a machine tool and a function of performing a simulation of the machining program. Software for creating an axis movement locus of a machine tool, for example, Computer Aided Machine (CAM) is installed in the PC 300, and the PC 300 executes a machining program to perform a simulation. The dedicated device 400 may also have a function of simulating a machining program in the same manner as the numerical control device 100. In the numerical control device 100, the PC 300, and the dedicated device 400, information required for executing a machining program is registered. This information is referred to as device registration information.

The device registration information is not necessarily information solely prepared for a setup operation and is existing information conventionally used for control of the machine tool 200. The device registration information may be registered not only in the numerical control device 100 that actually performs machining but also in the device that performs a simulation, such as the PC 300, the dedicated device 400, or the like.

In the present disclosure, setup support information required for a setup operation on an individual machining program is created in combination of machining program related information related to an individual machining program and device registration information registered in a device that executes the machining program.

Figure 3:
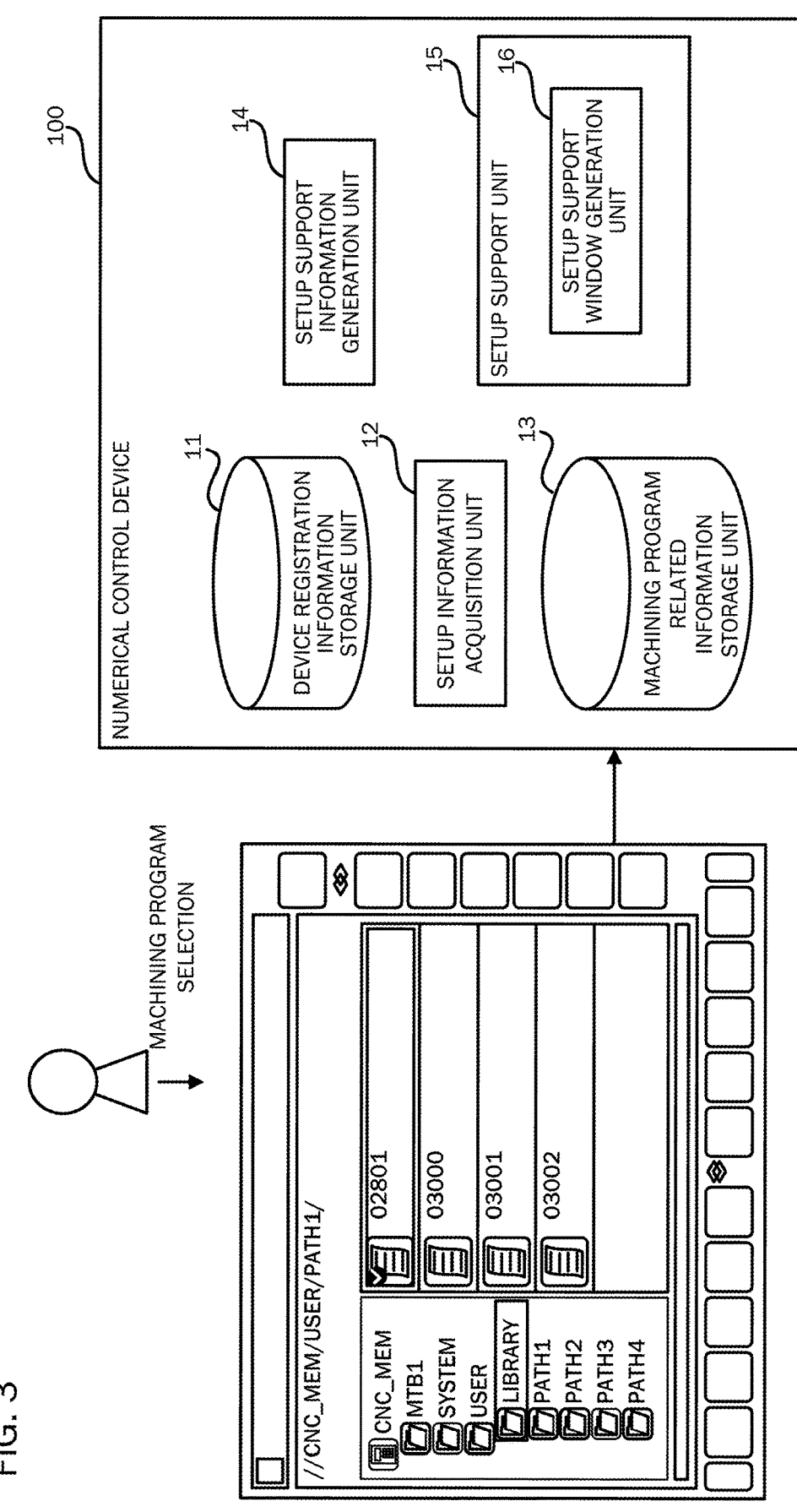
FIG. 3 is a block diagram of a numerical control device.

FIG. 3 is a block diagram of the numerical control device 100. The numerical control device 100 includes a device registration information storage unit 11 that stores device registration information registered in devices that execute a machining program, a setup information acquisition unit 12 that acquires setup information from machining program related information, a machining program related information storage unit 13 that stores information related to a machining program, a setup support information generation unit 14 that generates setup support information from the device registration information and the machining program related information, and a setup support unit 15 that performs setup support.

The device registration information storage unit 11 stores device registration information registered in devices that execute a machining program, such as the numerical control device 100, the PC 300, the dedicated device 400, or the like. In the device registration information, information that can be used for setup support is referred to as setup basic information. The setup basic information may be, for example, a tool number, a tool lifetime, or the like but is not limited thereto.

The setup information acquisition unit 12 acquires setup information from machining program related information. The setup information may include tool information, a material shape, a workpiece origin position, or the like. The setup information may be described in the header of a machining program or may be described in the middle of a machining program. The setup information acquisition unit 12 acquires setup information from a T command or a G code in a machining program or acquires setup information from a comment.

The shape of a workpiece can be found from a G code in a machining program. For example, "G1902" is a G code for setting a workpiece shape of a rectangular parallelepiped, "G1900" and "G1906" are for a column, "G1901" is for a cylinder (hollow), and "G1903" is for a prism. The shape and the dimension of a workpiece can be known from a G code described in a machining program. The workpiece origin position can be set by G codes of "G54 to G59". Note that setup information may be described in a comment of a machining program.

The setup support information generation unit 14 generates setup support information based on setup information acquired from machining program related information and setup basic information acquired from device registration information on the numerical control device 100, the PC 300, the dedicated device 400, or the like. The setup support information is used for support of a setup operation such as selection of a tool, mounting of a workpiece, measurement of a workpiece, or the like. In the first disclosure, a setup support window is created, a setup procedure is presented to an operator, and setup support is performed.

The setup support unit 15 includes a setup support window creation unit 16. The setup support window creation unit 16 creates a setup support window such as a tool selection window, a workpiece mount window, a workpiece measurement window, or the like based on setup support information. The setup support window interactively transfers a setup procedure to the operator.

FIG. 4 illustrates an example of the setup information, the setup basic information, and the setup support information.

Once the operator selects a machining program, the setup information acquisition unit 12 extracts setup information from the machining program. The setup information includes "T command" indicating a tool type, a "material shape" of a workpiece, and the workpiece origin position. In FIG. 4, the "T command" represents T1 and T2. The "material shape" indicating the shape of a workpiece can be acquired from a G code "G1902". The "G1902" indicates that the material shape is "rectangular parallelepiped". The parameter of "G1902" indicates the size "depth: 100, width:

100, height: 50" of the "rectangular parallelepiped". From the parameters of the G codes "G54 to G59", "workpiece origin position (50, 50, 50)" can be acquired.

The setup support information generation unit 14 generates setup support information based on the setup basic information and the setup information. The numerical control device 100 stores tool types corresponding to "T command" as the setup basic information. The setup support information generation unit 14 converts the T command "T1" into "drill tool" and the T command "T2" into "chamfering tool" with reference to the setup basic information.

Further, the setup support information generation unit 14 stores in advance calculation equations used for calculating a measuring method performed on a workpiece from the workpiece origin and the material shape (workpiece shape). The setup support information generation unit 14 determines that "measuring method" is "width measurement" based on "workpiece origin position (50, 50, 50)" and "material shape: rectangular parallelepiped (depth: 100, width: 100, height: 50)", which are acquired from the machining program, and "workpiece origin: depth×0.5, width×0.5, height", which is an equation in the setup basic information.

Accordingly, the setup support information of FIG. 4 is "T1: drill tool", "T2: chamfering tool", "material shape: rectangular parallelepiped", "workpiece origin position (50, 50, 50)", and "measuring method: width measurement".

Figure 5:
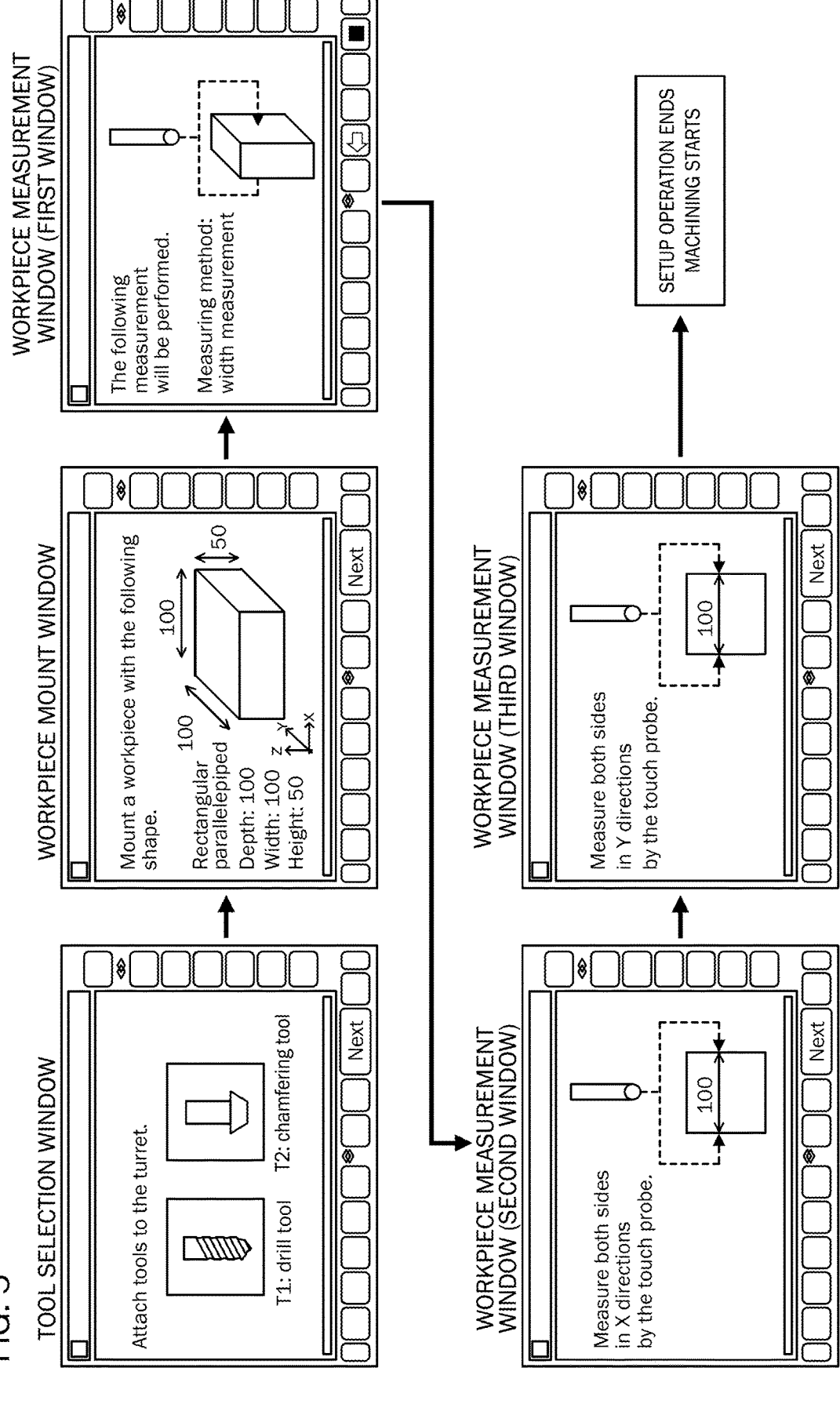
FIG. 5 is a diagram illustrating an example of setup support windows of the first disclosure.

The setup support window creation unit 16 displays a setup support window based on setup support information. FIG. 5 is an example of the setup support windows. The setup support windows of FIG. 5 include a tool selection window, a workpiece mount window, and workpiece measurement windows (first window) to (third window).

In the tool selection window, an instruction to the operator, "Attach tools to the turret", and the type of tools to be attached, "T1: drill tool", and "T2: chamfering tool", are displayed. Upon completion of the operation and in response to selection of the "Next" button on the bottom right in the tool selection window, a workpiece mount window is displayed.

In the workpiece mount window, an image of a workpiece to be mounted and a text describing the shape of the workpiece are displayed. In the workpiece mount window of FIG. 5, an instruction to the operator, "Mount a workpiece of the following shape", an image indicating the rectangular parallelepiped workpiece shape, and texts representing the workpiece shape, "Rectangular parallelepiped", "Depth: 100", "Width: 100", and "Height: 50", are displayed. Upon mounting of the workpiece and in response to selection of the "Next" button on the bottom right in the workpiece mount window, a workpiece measurement window (first window) is displayed.

The workpiece measurement window (first window) displays a measuring method implemented by a machining program (or a measurement program). In the workpiece measurement window (first window) of FIG. 5, description of the operation detail, "The following measurement will be performed", and a measuring method, "Measuring method: width measurement", are displayed. Furthermore, description of the width measurement, "The widths in X and Y directions will be measured by the touch probe", may be displayed.

In the workpiece measurement window (second window), a diagram illustrating a measuring movement of the probe and an operation detail for the user to "Measure both sides in the X directions by the touch probe" are displayed. Upon completion of the operation and in response to selection of the "Next" button on the bottom right in the workpiece measurement window (second window), a workpiece measurement window (third window) is displayed.

In the workpiece measurement window (third window), a diagram illustrating a measuring movement of the probe and an operation detail for the user to "Measure both sides in the Y directions by the touch probe" are displayed. Upon completion of the operation and in response to selection of the "Next" button on the bottom right in the third workpiece measurement window, the setup operation ends.

As described above, in the numerical control device 100 of the first disclosure, setup information is acquired from machining program related information, setup basic information is acquired from setting information on the numerical control device 100, the PC 300, and the dedicated device 400, and setup support windows are created from the setup information and the setup basic information.

In the setup support window, tool information, the shape of a workpiece, a measuring method performed on the workpiece, and the like are displayed. The user is able to perform a setup operation by simply referring to the setup support window, and this reduces the user workload. Further, an error in a setup operation can be reduced.

[Second Disclosure]

Figure 7:
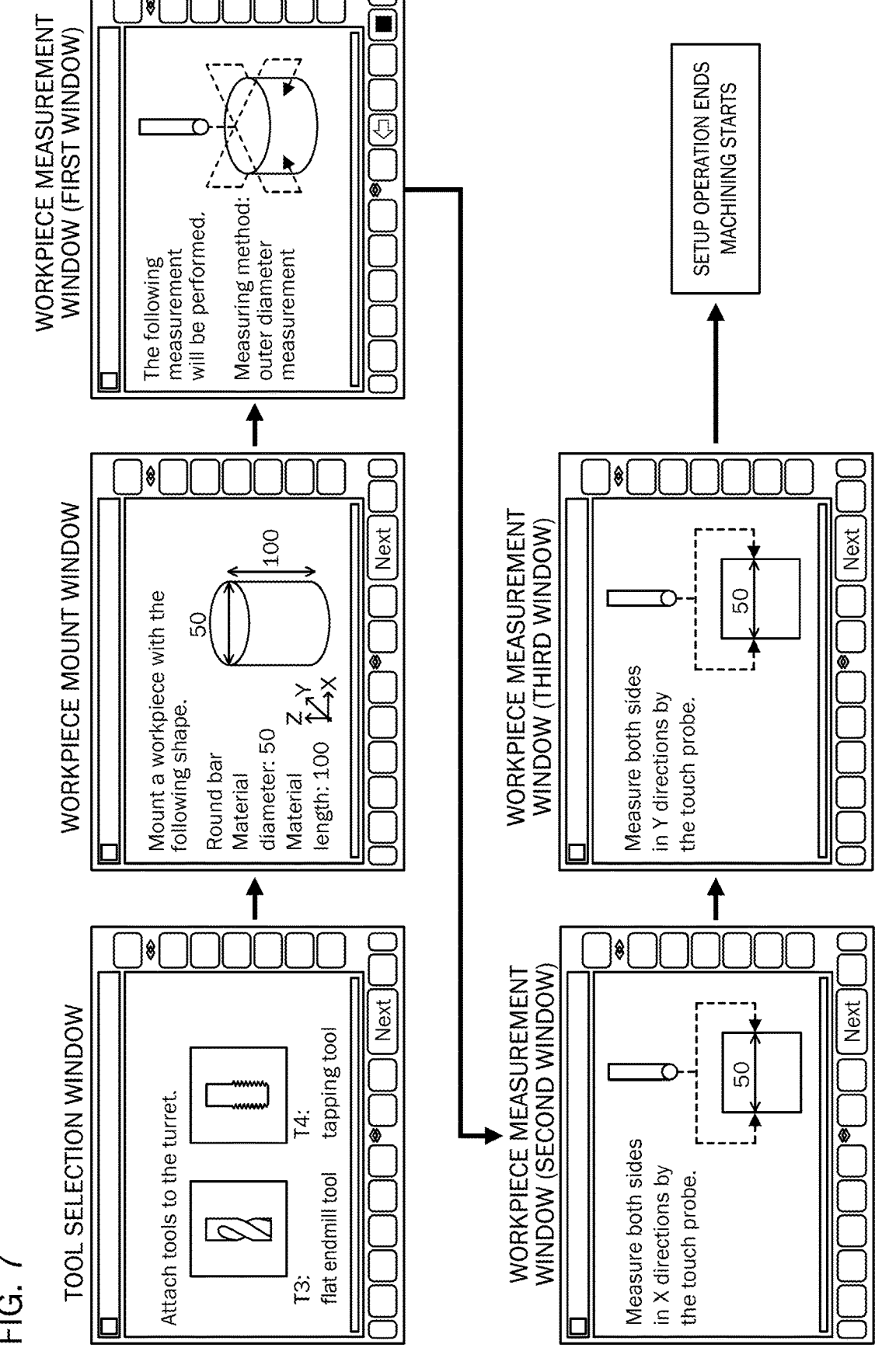
FIG. 7 is a diagram illustrating an example of setup support windows of the second disclosure.

An example of measuring a round bar workpiece will be described with reference to FIG. 6 and FIG. 7.

FIG. 6 illustrates an example of the setup information, the setup basic information, and the setup support information in the second disclosure. Once the operator selects a machining program, the setup information acquisition unit acquires setup information from machining program related information. The setup information includes "T command" indicating a tool type, "material shape" of a workpiece, and the workpiece origin position. In FIG. 6, the "T command" represents T3, T4. The "material shape" can be extracted from the G code "G1900". The "G1900" indicates that the material shape is "round bar". The parameter of "G1900" indicates that the size of the "round bar" is "material diameter: 50, material length: 100". Further, "workpiece origin position (25, 25, 100)" can be acquired from the parameters of the G codes "G54 to G59".

The setup support information generation unit 14 generates setup support information from setup basic information and setup information. The numerical control device 100 stores in advance tool types corresponding to "T command" as the setup basic information. Further, the setup support information generation unit 14 stores in advance calculation equations used for calculating a measuring method performed on a workpiece from the workpiece origin and the material shape (workpiece shape). The setup support information generation unit 14 converts "T3" into "flat endmill tool" and "T4" into "tapping tool" with reference to the setup basic information.

Since "workpiece origin position (25, 25, 100)" and "material shape: round bar (material diameter: 50, material length: 100)" that are extracted from the machining program satisfy the equation in the setup basic information "workpiece origin: material diameter×0.5, material diameter×0.5, material length", it can be seen that "measuring method" is "outer diameter measurement".

The setup support window creation unit 16 displays setup support windows based on setup support information. FIG. 7 is an example of the setup support windows. In the setup support of FIG. 7, first, a tool selection window is displayed. In the tool selection window, an instruction to the operator, "Attach tools to the turret", and the type of tools to be attached, "T3: Flat endmill tool" and "T4: Tapping tool", are displayed. Upon completion of the operation related to tool selection on the window and in response to selection of the "Next" button on the bottom right in the tool selection window, a workpiece mount window is displayed.

In the workpiece mount window, an image of a workpiece to be mounted and a text describing the shape of the workpiece are displayed. In the workpiece mount window of FIG. 7, an instruction to the operator, "Mount a workpiece of the following shape", an image indicating the round bar workpiece shape, and texts representing the workpiece shape, "Round bar", "Material diameter: 50", and "Material length: 100", are displayed. Accordingly, upon mounting of the workpiece and in response to selection of the "Next" button on the bottom right in the workpiece mount window, a workpiece measurement window (first window) is displayed.

The workpiece measurement window (first window) displays a measuring method implemented by a machining program (or a measurement program). In the workpiece measurement window (first window), description of the operation detail that "The following measurement will be performed" and description of a measuring method "Measuring method: outer diameter measurement" and "The widths in X and Y directions will be measured by the touch probe" are displayed.

In the same manner as in the first disclosure, the operation is performed according to the instructions of the workpiece measurement window (second window) and the workpiece measurement window (third window), and the workpiece measurement operation is then completed.

In the second disclosure, setup support on a round bar workpiece is performed. The shape of the workpiece can be acquired from the G code "G1900" in the machining program. The parameter of "G1900" defines the dimension of the round bar. The measuring method can be calculated from the workpiece origin. The workpiece origin is acquired form the machining program. The tool type can be acquired from the "T command" in the machining program. The T code can be converted into the tool type.

As described above, in the numerical control device 100 of the present disclosure, setup support can be performed even with machining programs for different workpiece shapes. The information required for the setup operation, such as a tool type, a workpiece shape, a measuring method, or the like can be automatically acquired from machining program related information and setting information.

[Third Disclosure]

In the third disclosure, "attachment state" and "tool lifetime" of a tool are acquired as the setup basic information from the device registration information storage unit 11 and presented to the user. These "attachment state" and "tool lifetime" of a tool each are existing information conventionally used for tool management by the numerical control device 100.

In the setup support information of the third disclosure, "attachment state" and "tool lifetime" are added to the setup support information of the first and second disclosures described above. In the example of FIG. 8, "attachment state" and "tool lifetime" for tool numbers "T1" and "T2", that is, the information "T1: already attached, lifetime expired" and the information "T2: not yet attached, lifetime left" are added.

Figure 9:
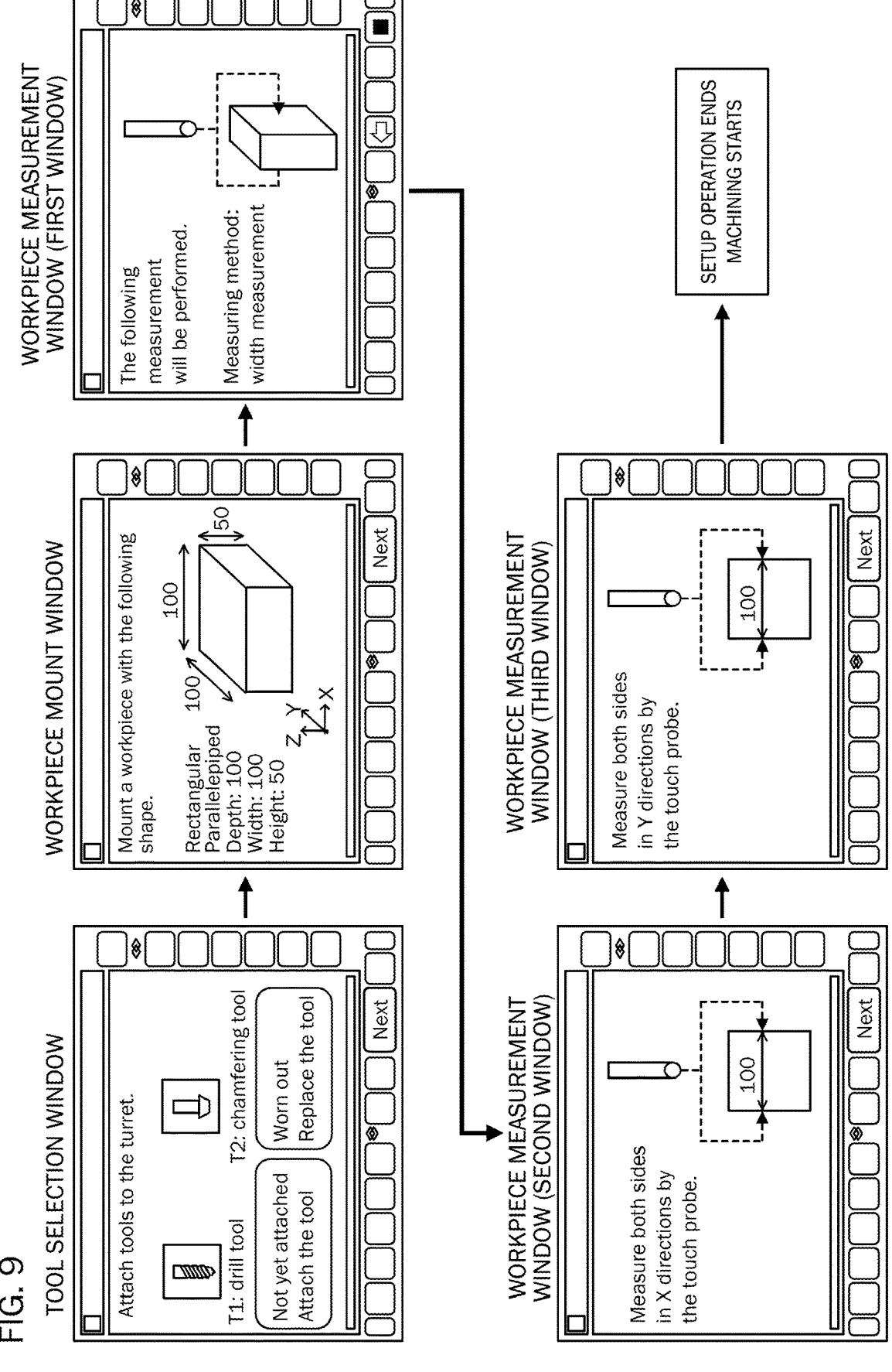
FIG. 9 is a diagram illustrating an example of setup support windows of the third disclosure.

In the setup support window of the third disclosure, the tool selection window differs from that of the first and second disclosures. In the tool selection window of the third disclosure illustrated in FIG. 9, an instruction to the operator, "Attach the following tools to the turret", and texts related to the tool attachment state and the tool lifetime, "Not yet attached. Attach the tool" and "The tool is worn out. Replace the tool", are displayed in addition to the tool types "T1: drill tool" and "T2: chamfering tool". Upon completion of the operation according to the window and in response to selection of the "Next" button on the bottom right in the tool selection window, a workpiece mount window is displayed.

Since the operation after the workpiece mount window is displayed is the same as that in the first and second disclosures described above, the description thereof will be omitted.

In the third disclosure, information related to the tool attachment state or the tool lifetime is read from setup basic information of the numerical control device 100 and displayed in the tool selection window. Since the operator is able to check information related to a tool, such as whether or not the tool is attached or whether or not the tool lifetime is reached, with reference to the tool selection window, the operator workload is reduced.

[Fourth Disclosure]

Figure 10:
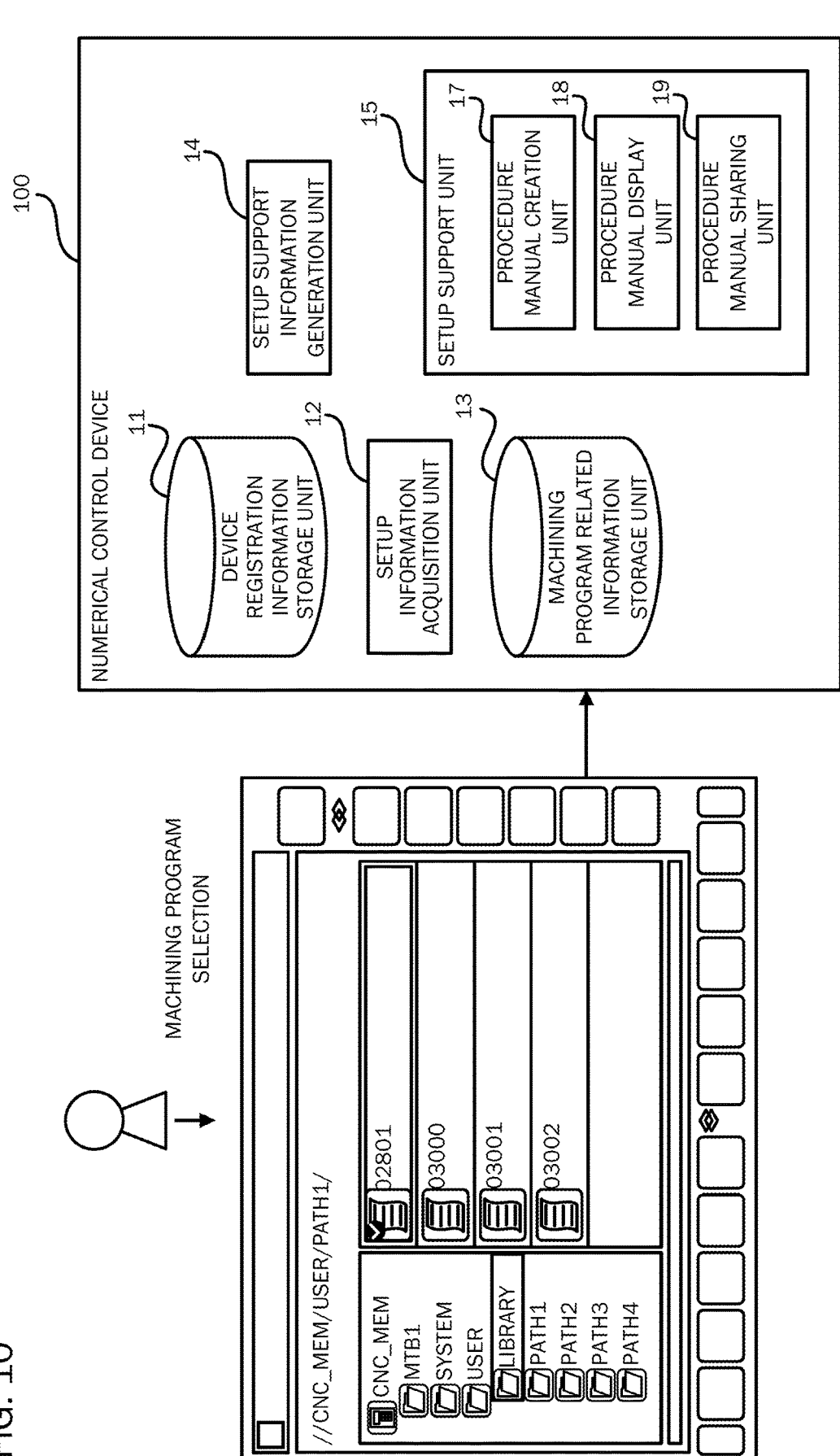
FIG. 10 is a block diagram of a numerical control device of a fourth disclosure.

In the fourth disclosure, a procedure manual for a setup operation is created. FIG. 10 is a block diagram of a numerical control device 100 of the fourth disclosure. The numerical control device 100 of the fourth disclosure includes a procedure manual creation unit 17, a procedure manual display unit 18, and a procedure manual sharing unit 19 as the setup support unit 15.

The procedure manual creation unit 17 creates a setup procedure manual from the setup support information. The setup procedure manual is document data describing a procedure of a setup operation. FIG. 11 illustrates an example of a setup procedure manual. The setup procedure manual of FIG. 11 describes "O2001 Setup Procedure Manual" on the first row. The "O2001" is a name of a machining program (or measurement program). It describes under the name that "Please perform setup according the following procedures." Further, it describes the first operation content, "1. Attach the following tools to the turret", "T1: drill tool", and "T2: chamfering tool", describes the second operation content, "2. Attach the following shapes to the vise", "Material shape: rectangular parallelepiped", "Depth: 100", "Width: 100", and "Height: 50", and describes the third operation content, "3. Perform the following measurement on the workpiece" and "Measuring method: width measurement".

In the fourth disclosure, document data describing a setup procedure is created based on the setup support information. The setup procedure manual is document data and thus can be viewed at a number of information processing devices. It is therefore possible to store a setup procedure manual in a portable storage medium and display the setup procedure manual on a personal computer (PC), a mobile phone, a console screen of a server, an operation screen of the numerical control device 100, or the like.

Further, as illustrated in FIG. 12, it is also possible to store a setup procedure manual in a server and share the setup procedure manual by a plurality of numerical control devices 100 (or machine tools). The procedure manual sharing unit 19 uploads a setup procedure manual created by the numerical control device 100 to the server or reads the setup procedure manual uploaded to the server by another numerical control device 100.

In the fourth disclosure, document data describing a procedure of a setup operation is created, and it is therefore possible for a number of information processing devices to share a setup procedure manual.

[Fifth Disclosure]

The numerical control device 100 of the fifth disclosure creates a control program or a control instruction of a peripheral device that performs a setup operation, such as a robot 500, a transport machine 600, or the like and causes the peripheral device to perform the setup operation.

Figure 13:
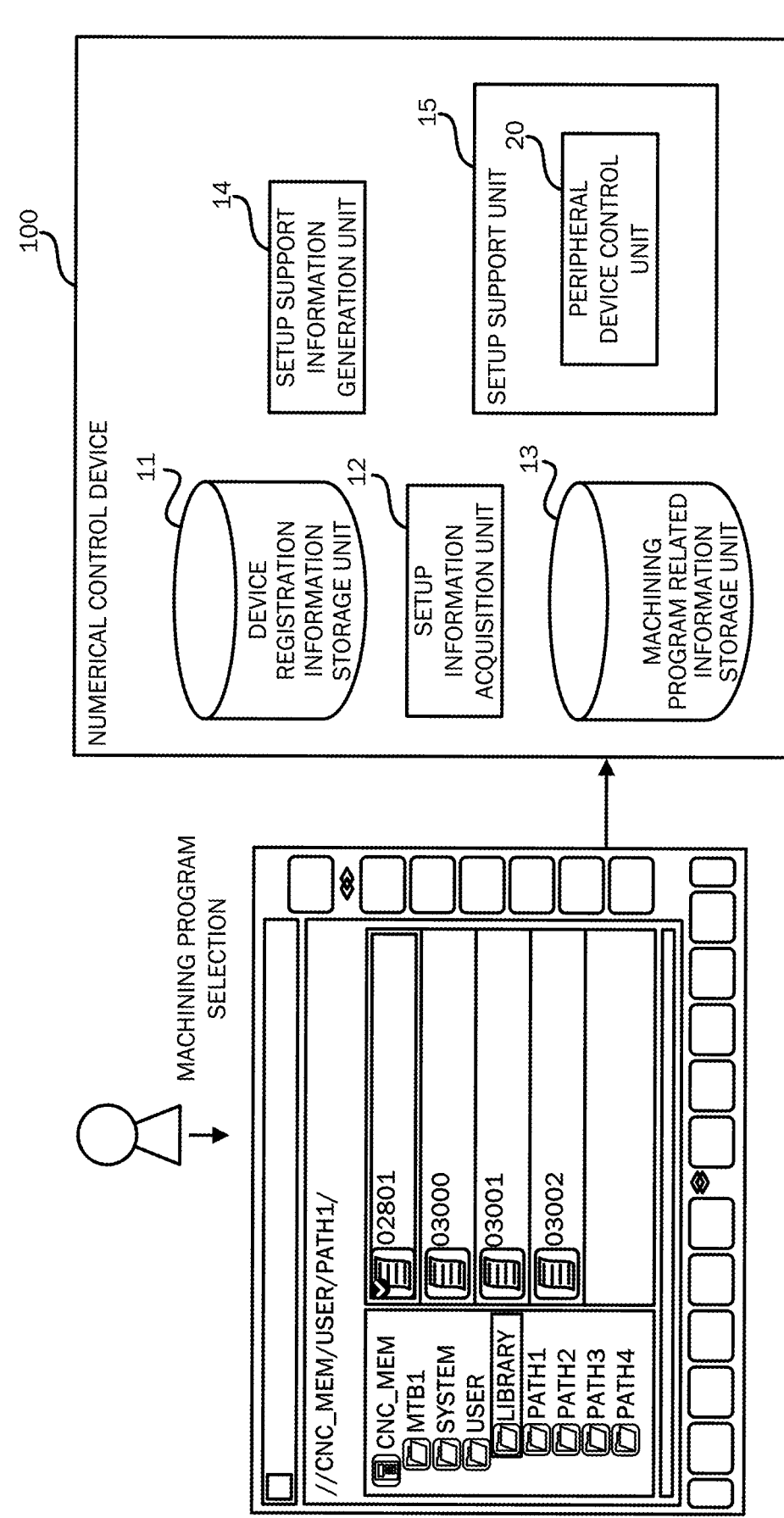
FIG. 13 is a block diagram of a numerical control device of a fifth disclosure.

FIG. 13 is a block diagram of the numerical control device 100 of the fifth disclosure.

The setup support unit 15 includes a peripheral device control unit 20. A method of controlling a peripheral device is not particularly limited in the fifth disclosure. The peripheral device control unit 20 creates a control program of a peripheral device and outputs a control signal to the peripheral device. The control program or the control signal is created by an existing method.

The numerical control device 100 of the fifth disclosure is featured in that the numerical control device 100 reads information such as a tool type, a turret number, a mounting direction of a workpiece W, or the like from the setup support information and creates a peripheral device control program of the robot 500, the transport machine 600, or the like.

Figure 14:
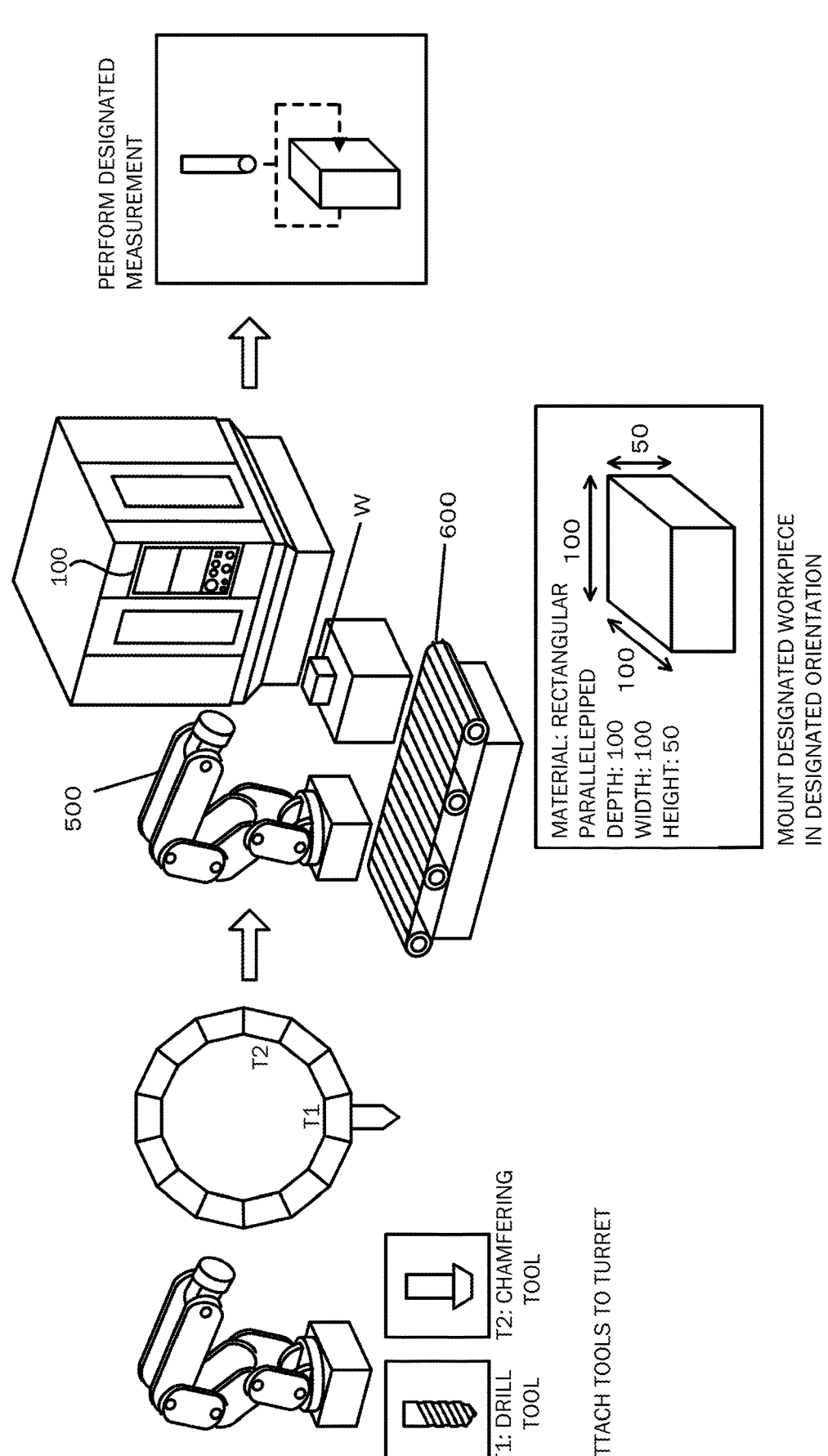
FIG. 14 is a diagram illustrating a setup operation for a robot.

In the example of FIG. 14, the transport machine 600 transports a tool described in the setup support information to the numerical control device 100. The tool is attached to the turret of the machine tool 200. A number is set for the turret, and the robot 500 attaches a tool in accordance with the number (in the example of FIG. 14, "drill tool" is attached as "T1", and "chamfering tool" is attached as "T2"). The robot 500 also mounts the workpiece W. The robot 500 mounts the workpiece W of "rectangular parallelepiped" to have the orientation of "depth: 100", "width: 100", and "height: 50" in accordance with the control program or the control signal created by the peripheral device control unit 20.

After the tools and the workpiece W are attached, the numerical control device 100 controls the machine tool 200 to automatically perform measurement of the workpiece W. An existing measurement program is used for the workpiece measurement program. The measuring method performed on the workpiece W is described in the setup support information.

In the fifth disclosure, a control program and a control signal for a peripheral device such as the robot 500 or the transport machine 600 are created based on the setup support information. The transport machine 600 transports a workpiece in accordance with a machining program to the numerical control device 100, and the robot 500 mounts the workpiece W in accordance with the machining program in a direction designated by the machining program. Furthermore, the robot 500 attaches the tool defined by the machining program to the designated position.

In such a way, in the fifth disclosure, the robot 500 is controlled based on the setup support information, and thereby the operation which would otherwise be performed by the operator is automated to reduce the operator workload.

[Sixth Disclosure]

Figure 15:
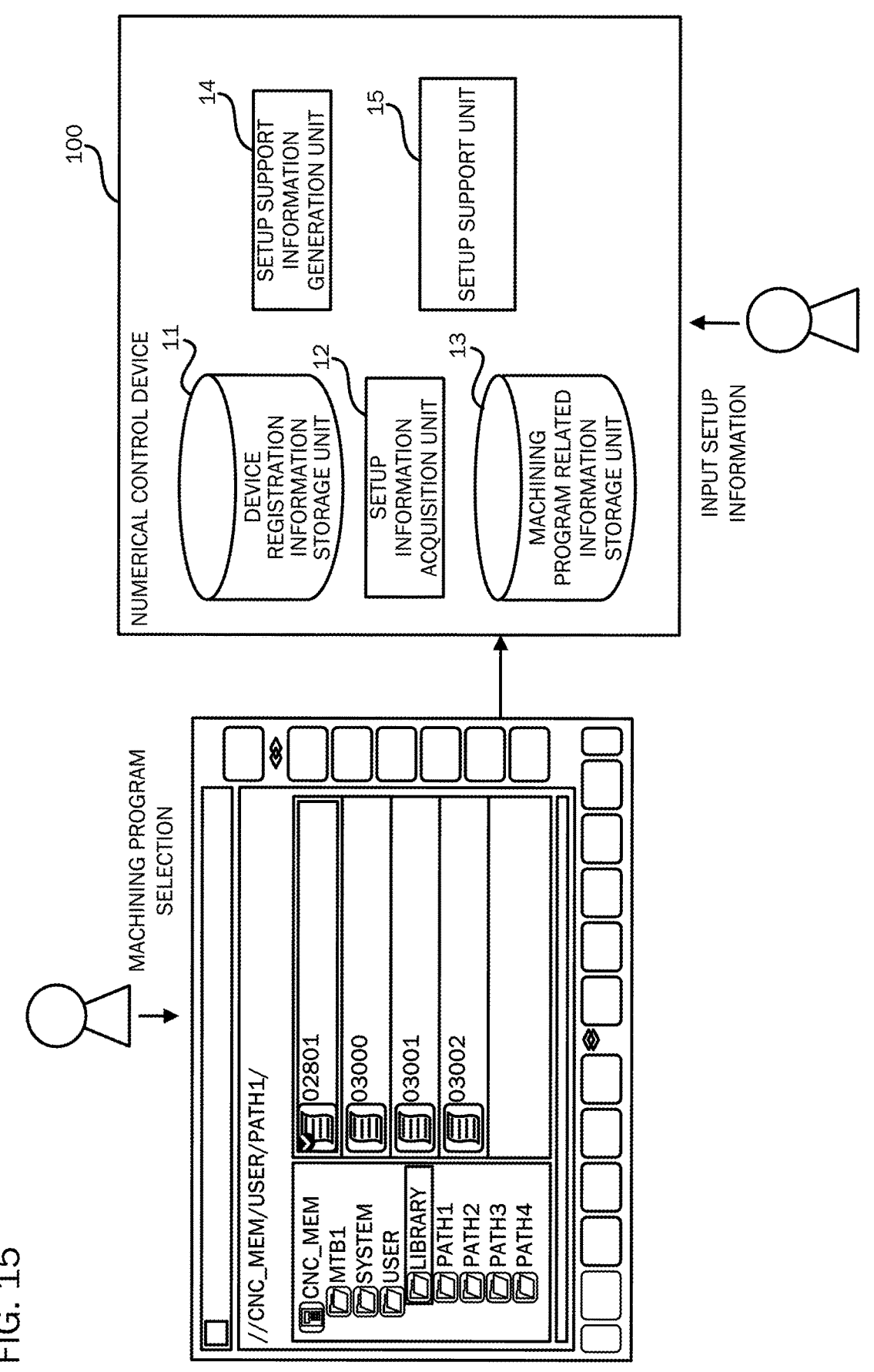
FIG. 15 is a block diagram of a numerical control device of a sixth disclosure.

In the sixth disclosure, the operator inputs the setup information, as illustrated in FIG. 15. When it is not possible to acquire the information required for setup support from the machining program related information or the setting information, the setup information acquisition unit 12 displays an entry window or the like and acquires the required information from the operator.

Once acquiring the information required for a setup operation, the numerical control device 100 of the sixth disclosure performs the same process as that in the first to fifth disclosures described above.

The setup information may be not only input directly to the numerical control device 100 but also input from a PC or a server on a network. In recent factories, a number of machines are connected via a network, and individual machine tools 200 may be managed by a central server.

When the setup information is input online, the operator who manages production may input information on a workpiece intended to machine or tool information from the central server and provide an instruction for machining of components in shortage to perform production adjustment.

As described above, the numerical control device 100 of the first to sixth disclosures creates setup support information from setup information acquired from machining program related information and setup basic information set for a device configured to execute a machining program and performs setup support on the operator. The machining program related information is information related to an individual machining program, and the setting information on a device configured to execute a machining program is information related to an individual device. The numerical control device 100 of the present disclosure combines these pieces of information to create the setup support information. In the numerical control device 100 of the present disclosure, since setup information is automatically read from the machining program related information, this reduces the operator burden of analyzing a machining program.

Further, since a procedure of a setup operation is displayed on a screen or the peripheral device automatically performs a setup operation, the operator burden is reduced. Document data is of high versatility and can be read by substantially all the information processing terminals. Further, the setup procedure can be accumulated in a server and can be shared by a plurality of machine tools. While some operation machining programs do not include the setup information, required setup information can be obtained even in such a case.

Although all the setup operations of the present disclosure are performed in the numerical control device 100, the process of the setup information acquisition unit 12 that extracts setup information from a machining program and the process of the setup support information generation unit 14 that generates setup support information from setup basic information and setup information may be distributed to and performed by information processing devices on the network.

LIST OF REFERENCE SYMBOLS

100 numerical control device
200 machine tool
300 PC
400 dedicated device
11 device registration information storage unit
12 setup information acquisition unit
13 machining program related information storage unit
14 setup support information generation unit
15 setup support unit
16 setup support window creation unit
17 procedure manual creation unit
18 procedure manual display unit
19 procedure manual sharing unit
20 peripheral device control unit
111 CPU
114 nonvolatile memory
115 sensor

The invention claimed is:

1. A numerical control device that controls a machine tool, the numerical control device comprising a processor, the processor:

acquires setup information required for a setup operation from machining program related information including at least one of a part or whole of a machining program of the machine tool or information related to the machining program;

acquires setup basic information from device registration information registered in a device configured to execute a machining program of the machine tool and generates setup support information from the setup information and the setup basic information; and supports a setup operation of the machining program by using the setup information and the setup support information, wherein the setup basic information includes a workpiece origin and a workpiece material shape, and wherein the processor calculates, from the workpiece origin and the workpiece material shape acquired from the machining program, a measuring method performed on a workpiece.

2. The numerical control device according to claim 1, wherein the processor creates a setup support window indicating a procedure of a setup operation by using the setup support information.

3. The numerical control device according to claim 1, wherein the processor creates document data indicating a procedure of a setup operation by using the setup support information.

4. The numerical control device according to claim 1, wherein the processor creates a control program or signal that causes a peripheral device to perform a setup operation by using the setup support information.

5. A non-transitory machine-readable storage medium storing a computer readable instruction for: when executed by one or a plurality of processors:

acquiring setup information required for a setup operation from machining program related information including at least one of a part or whole of a machining program of a machine tool or information related to the machining program;

acquiring setup basic information from device registration information registered in a device configured to execute a machining program of the machine tool and generating setup support information from the setup information and the setup basic information; and performing setup support corresponding to the machining program by using the setup support information, wherein the setup basic information includes a workpiece origin and a workpiece material shape, and wherein in the generating setup support information calculates, from the workpiece origin and the workpiece material shape acquired from the machining program, a measuring method performed on a workpiece.

6. The non-transitory machine-readable storage medium according to claim 5 storing a computer readable instruction for creating a setup support window indicating a procedure of a setup support operation by using the setup support information to perform setup support corresponding to the machining program.

7. The non-transitory machine-readable storage medium according to claim 5 storing a computer readable instruction for creating document data indicating a procedure of setup support by using the setup support information to perform setup support corresponding to the machining program.

8. The non-transitory machine-readable storage medium according to claim 5 storing a computer readable instruction for creating a control program or signal that causes a robot or a transport machine to perform a setup operation by using the setup support information.

\* \* \* \* \*